United States Patent
Shen et al.

(10) Patent No.: US 7,031,444 B2
(45) Date of Patent: Apr. 18, 2006

(54) COMPUTER-IMPLEMENTED VOICE MARKUP SYSTEM AND METHOD

(75) Inventors: Liang Shen, North York (CA); Umakanthan Shunmuganathan, North York (CA)

(73) Assignee: VoiceGenie Technologies, Inc., Toronto (CA)

( * ) Notice: Subject to any disclaimer, the term of this patent is extended or adjusted under 35 U.S.C. 154(b) by 682 days.

(21) Appl. No.: 10/180,894

(22) Filed: Jun. 26, 2002
(Under 37 CFR 1.47)

(65) Prior Publication Data

US 2003/0118159 A1 Jun. 26, 2003

Related U.S. Application Data

(60) Provisional application No. 60/302,156, filed on Jun. 29, 2001.

(51) Int. Cl.
*H04M 1/64* (2006.01)
*H04L 12/66* (2006.01)

(52) U.S. Cl. .................... 379/88.17; 370/352
(58) Field of Classification Search .............. None
See application file for complete search history.

(56) References Cited

U.S. PATENT DOCUMENTS

| | | | |
|---|---|---|---|
| 4,520,576 A | 6/1985 | Vander Molen | |
| 5,749,072 A | 5/1998 | Mazurkiewicz et al. | |
| 5,822,012 A | 10/1998 | Jeon et al. | |
| 5,835,667 A | 11/1998 | Wactlar et al. | |
| 5,838,665 A | 11/1998 | Kahn et al. | |
| 5,889,774 A | 3/1999 | Mirashrafi et al. | |
| 5,999,612 A | 12/1999 | Dunn et al. | |
| 5,999,965 A | 12/1999 | Kelly | |
| 6,028,917 A | 2/2000 | Creamer et al. | |
| 6,185,527 B1 | 2/2001 | Petkovic et al. | |
| 6,226,361 B1 | 5/2001 | Koyama | |
| 6,252,947 B1 | 6/2001 | Diamond et al. | |
| 6,310,873 B1 | 10/2001 | Rainis et al. | |
| 6,337,858 B1 | 1/2002 | Petty et al. | |
| 6,397,181 B1 | 5/2002 | Li et al. | |
| 6,487,595 B1 | 11/2002 | Turunen et al. | |
| 6,542,499 B1 | 4/2003 | Murphy et al. | |
| 6,597,687 B1 | 7/2003 | Rao | |
| 6,600,736 B1 * | 7/2003 | Ball et al. | .......... 370/352 |
| 6,615,173 B1 | 9/2003 | Celi, Jr. | |

(Continued)

OTHER PUBLICATIONS

U.S. Appl. No. 09/759,829 filed Jan. 12, 2001 entitled "Audio Advertising Computer System And Method".

(Continued)

*Primary Examiner*—Fan Tsang
*Assistant Examiner*—Simon P. Sing
(74) *Attorney, Agent, or Firm*—Jones Day

(57) ABSTRACT

A computer-implemented method and system for processing a service request received from a telephone communication device. The telephony system and method utilizes a call management server and a voice interpreter server. The call management server receives an incoming call from a user, and the voice interpreter server processes the service request contained in the incoming call. Data communication encapsulation is used to communicate data between the call management server and the voice interpreter platform in order to process the service request.

30 Claims, 19 Drawing Sheets

U.S. PATENT DOCUMENTS

| | | |
|---|---|---|
| 6,643,622 B1 | 11/2003 | Stuart et al. |
| 6,654,722 B1 | 11/2003 | Aldous et al. |
| 6,674,745 B1 | 1/2004 | Schuster et al. |
| 6,700,884 B1 | 3/2004 | Emerson, III |
| 6,704,305 B1 | 3/2004 | Emerson, III |
| 6,704,708 B1 | 3/2004 | Pickering |
| 6,707,811 B1 | 3/2004 | Greenberg et al. |
| 6,714,535 B1 | 3/2004 | Herh |
| 6,721,705 B1 | 4/2004 | Kurganov et al. |
| 6,760,343 B1 * | 7/2004 | Krishnamurthy et al. ... 370/466 |
| 2002/0006124 A1 | 1/2002 | Jimenez et al. |

OTHER PUBLICATIONS

U.S. Appl. No. 09/759,926 filed Jan. 12, 2001 entitled "Computer-Implemented Voice Application Indexing Web Site".

U.S. Appl. No. 09/759,931 filed Jan. 12, 2001 entitled "Computer-Implemented Voice Markup Language-Based Server".

U.S. Appl. No. 09/760,028 filed Jan. 12, 2001 entitled "Home-Based Client-Side Media Computer".

* cited by examiner

COMPUTER-IMPLEMENTED VOICE MARKUP SYSTEM AND METHOD

RELATED APPLICATION

This application claims priority to U.S. application (Ser. No. 60/302,156), filed Jun. 29, 2001, entitled "Computer-Implemented Voice Markup System and Method". By this reference, the full disclosure, including the drawings, of U.S. application (Ser. No. 60/302,156) is incorporated herein.

BACKGROUND AND SUMMARY

The present invention is directed to Internet-based voice systems. More specifically, the present invention is directed to Internet-based voice systems that are used within computer server networks.

Telephone users are steadily increasing their demands for services that are accessible through their telephones. Telephone users want access to the ranges and types of services that they are accustomed to accessing over the Internet. Such Internet services include, for example, content searching as provided by such companies as Yahoo or Infoseek. Other services include address or phone number lookups.

The Internet provides users with visually-based interfaces to access the service applications. However, telephone users have difficulty in using Internet applications due to their devices not being adept to interacting with the visually-based interfaces of the Internet applications. For example, cell phone users have relatively small displays within which to view Internet information. Thus, telephony systems that can efficiently and effectively provide such services to cell phone users as well as to other telephone users are highly desirable.

The present invention allows such services to be efficiently and effectively provided to the users. The telephony system of the present invention includes a call management server and a voice interpreter server. The call management server receives an incoming call from a user, and the voice interpreter server processes the service request contained in the incoming call. Data communication encapsulation is used to communicate data between the call management server and the voice interpreter platform in order to process the service request.

DETAILED DESCRIPTION OF THE PREFERRED EMBODIMENT

Figure 1:
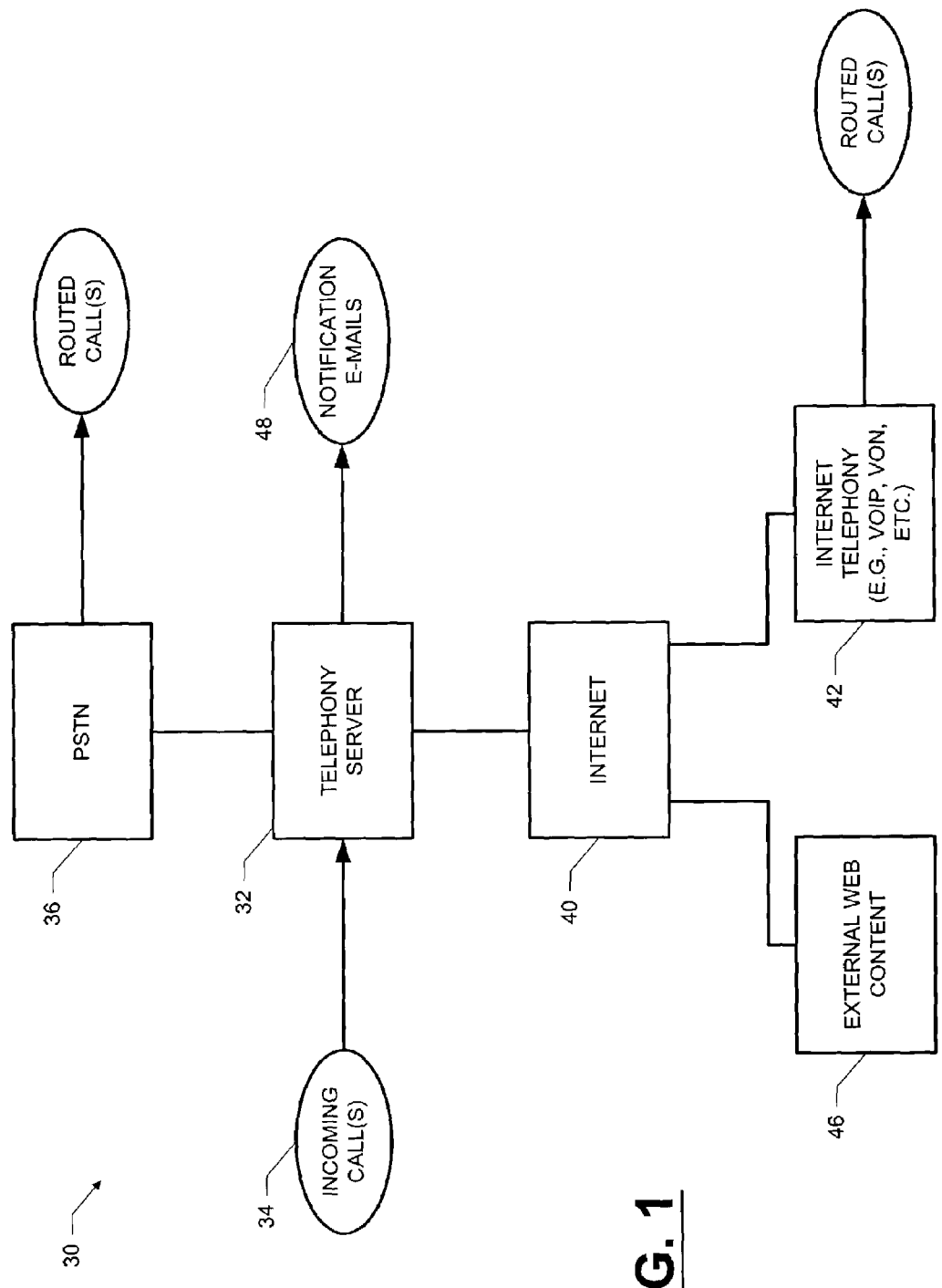
FIG. 1 is a block diagram that depicts the computer-implemented environment of the present invention.

FIG. 1 is a system block diagram that generally shows at 30 the computer-implemented components of the present invention. A telephony server 32 of the present invention processes incoming calls 34 so that a telephone conversation may occur between the person who placed the call and the desired call recipient. The telephony server 32 processes and routes the incoming calls 34 either through a PSTN (public switched telephone network) connection 36 and/or an Internet connection 40. The telephony server 32 may use a VoiceXML interpreter layer to allow access to a VoiceXML interpreter that will process a user's service request (This aspect is discussed throughout the figures, and in particular FIGS. 13–19).

With reference to FIG. 1, the telephony server 32 may select to route the call to the person through a PSTN connection 36 and/or Internet channel 40. The telephony server 32 may use a Voice Over IP (VoIP) product, a Voice on the Net (VON) product, or other such similar products to place the call over the Internet telephony channel 42. An example of a VoIP product is the VoIP product available from VocalTec Communications Ltd. located in Fort Lee, N.J. An example of a VON product is the VON product available from Intel located in Austin, Tex.

The telephony server 32 examines whether to use a PSTN connection 36 or an Internet connection 40 to route the call 34. The examination is based upon the location of the person with whom the user wishes to speak and a cost comparison between using an Internet connection 40 to make the call versus a PSTN connection 36. If the telephony server 32 decides not to use an Internet connection 40 to route the call 34, then the call 34 is routed through the PSTN connection 36, and the user communicates with the desired person through the PSTN connection 36.

If the telephony server 32 decides to use an Internet connection 40 to route the call 34, then the call 34 is routed through an Internet connection 40 to the remote location where the desired person is located. The telephony server 32 may also further examine whether to route the call 34 for a predetermined distance with the Internet connection 40, and then finish routing the call 34 through a PSTN connection 36. The decision may be based upon whether the PSTN connection 36 is less expensive to finish routing the call 34 to the desired person and whether the PSTN connection 36 is the only viable channel to complete the routing.

A user may also communicate with the telephony server 32 in order to request one or more services. For example, the user may call the telephony server 32 in order to locate a restaurant at which to dine. The incoming call 34 is received by the telephony server 32, and the telephony server 32 asks questions to the user in order to determine the type of service. The telephony server 32 recognizes the words of the user to obtain the parameters of the restaurant search to be conducted. If abnormal conditions are detected by the telephony server 32 during processing, then the telephony server 32 sends notification electronic mail messages 48 to the appropriate personnel so that the abnormal conditions can analyzed and remedied if needed.

The telephony server 32 may obtain external web content 46 to assist it in handling the service request. This includes the external web content 46 providing voice applications to interact with the user. The external web content 46 may also perform the searching needed to provide the service. For example, the telephony server 32 may send search criteria to a restaurant location web site so that the web site can determine restaurants that satisfy the search criteria.

Figure 2:
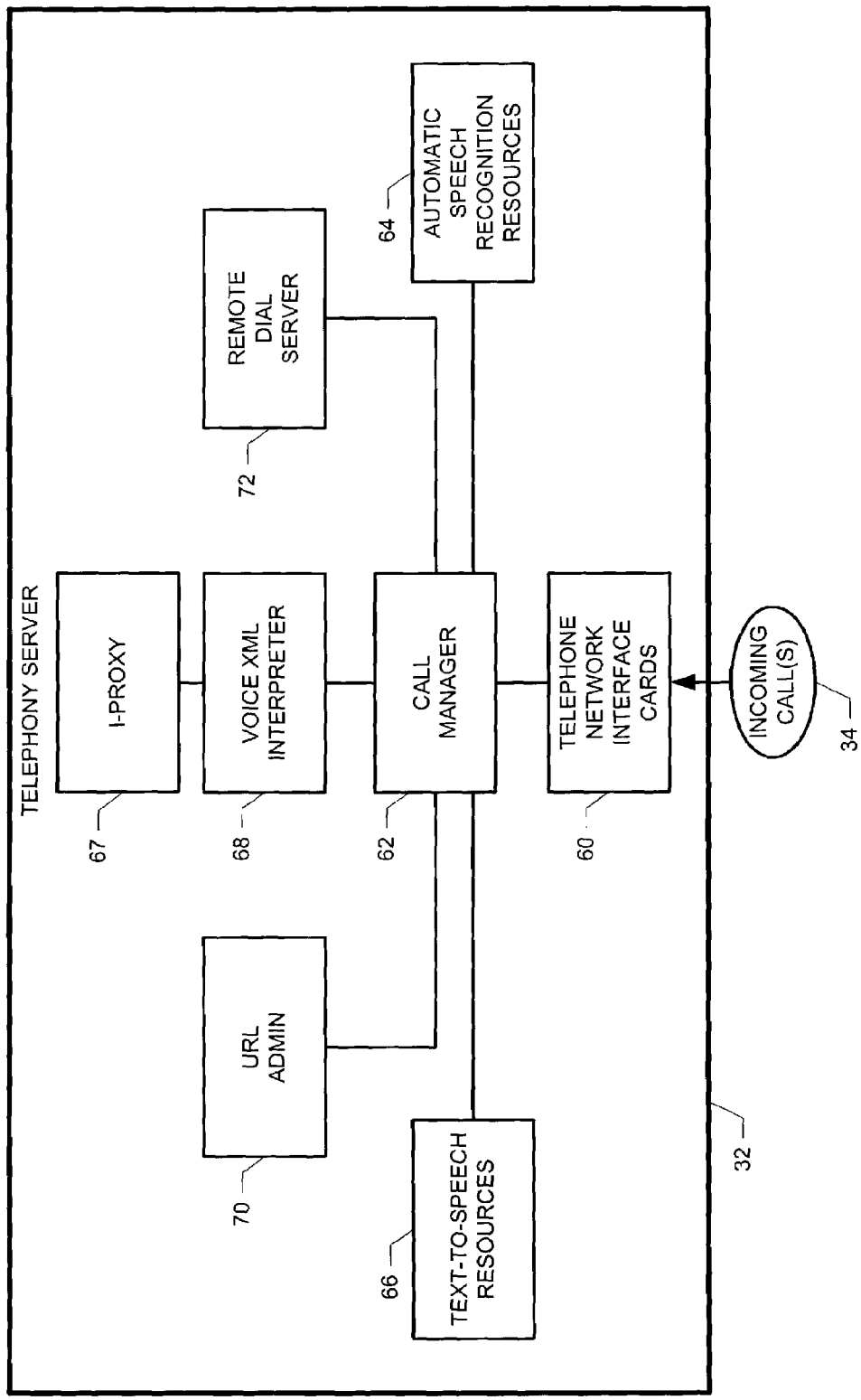
FIGS. 2 and 3 are block diagrams that depict the internal computer-implemented components of the present invention.
Figure 3:
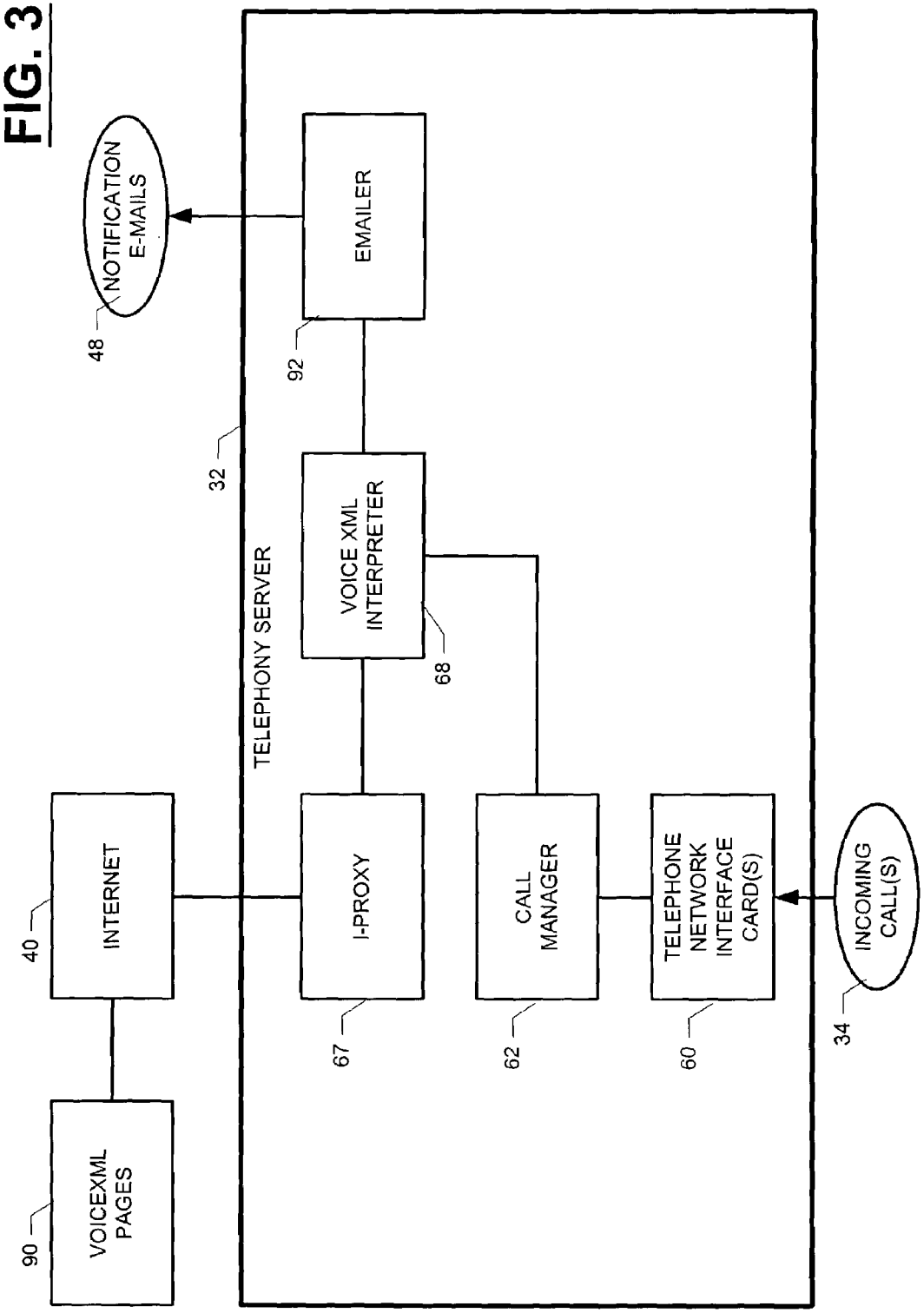

FIGS. 2 and 3 depict internal computer-implemented components of the present invention that handle service requests of a user. With reference to FIG. 2, the telephony server 32 utilizes a telephone network interface card 60 to handle the interface with incoming calls 34. An example of a telephone interface card includes the telephone interface card from Dialogic Corp. located in Massachusetts.

The telephony server 32 includes a call manager 62 which uses automated speech recognition tools to recognize the speech uttered by the user. Preferably, the tools include automatic speech recognition resources 64 as well as text-to-speech resources 66. Different speech engines are used based upon the application at hand. For example, one type of text-to-speech engine may be used when conversing with the user in French, while another engine is used with another user in English.

The call manager 62 determines whether a voice application is needed to service the request of the user. One or more voice pages (i.e., applications) are obtained and stored in a web proxy 67 located on the telephony server. The web proxy 67 may retrieve voice applications over the Internet and cache the voice applications in order to improve the performance of servicing the user's request. A VoiceXML interpreter 68 (i.e., a voice markup language engine) on the telephony server 32 executes the voice applications and may utilize one or more speech engines (64, 66) in order to interact with the user (FIG. 12 describes in further detail the VoiceXML interpreter 68.

A uniform resource locator (URL) administrator 70 associates a telephone number with an Internet location (e.g., via a URL). For example, a user may have requested an individual's telephone number by dialing "1-555-1212" to obtain the information. The telephony server 32 associates this number with a predetermined URL which identifies a phone number lookup voice application. A remote dial server 72 provides an Internet telnet interface so that requests may be made to the call manager 62 for outbound dialing associated with a voice application. A remote dial server 72 is used for example to initiate an outbound call without receiving a corresponding triggering inbound call, such as when a user configures the present invention to issue the user a wake-up call for 6:00 a.m. the next morning.

FIG. 3 depicts the computer-implemented components that operate with the VoiceXML interpreter 68. As described above, the VoiceXML interpreter 68 on the telephony server 32 executes voice applications in order to interact with the user. The VoiceXML interpreter 68 determines whether a voice application is needed to service a request of a user. An embodiment of the present invention uses a voice markup language known in the speech industry as VoiceXML (Voice Extensible Markup Language). The VoiceXML interpreter 68 determines which VoiceXML application(s) can service the request of the remote user. The VoiceXML interpreter 68 communicates over an Internet connection 40 to locate suitable VoiceXML applications 90. If abnormal conditions are detected by the VoiceXML interpreter 68, then an E-mail module 92 sends electronic mail messages 48 to the appropriate personnel so that the abnormal conditions can analyzed and remedied if needed.

Figure 4:
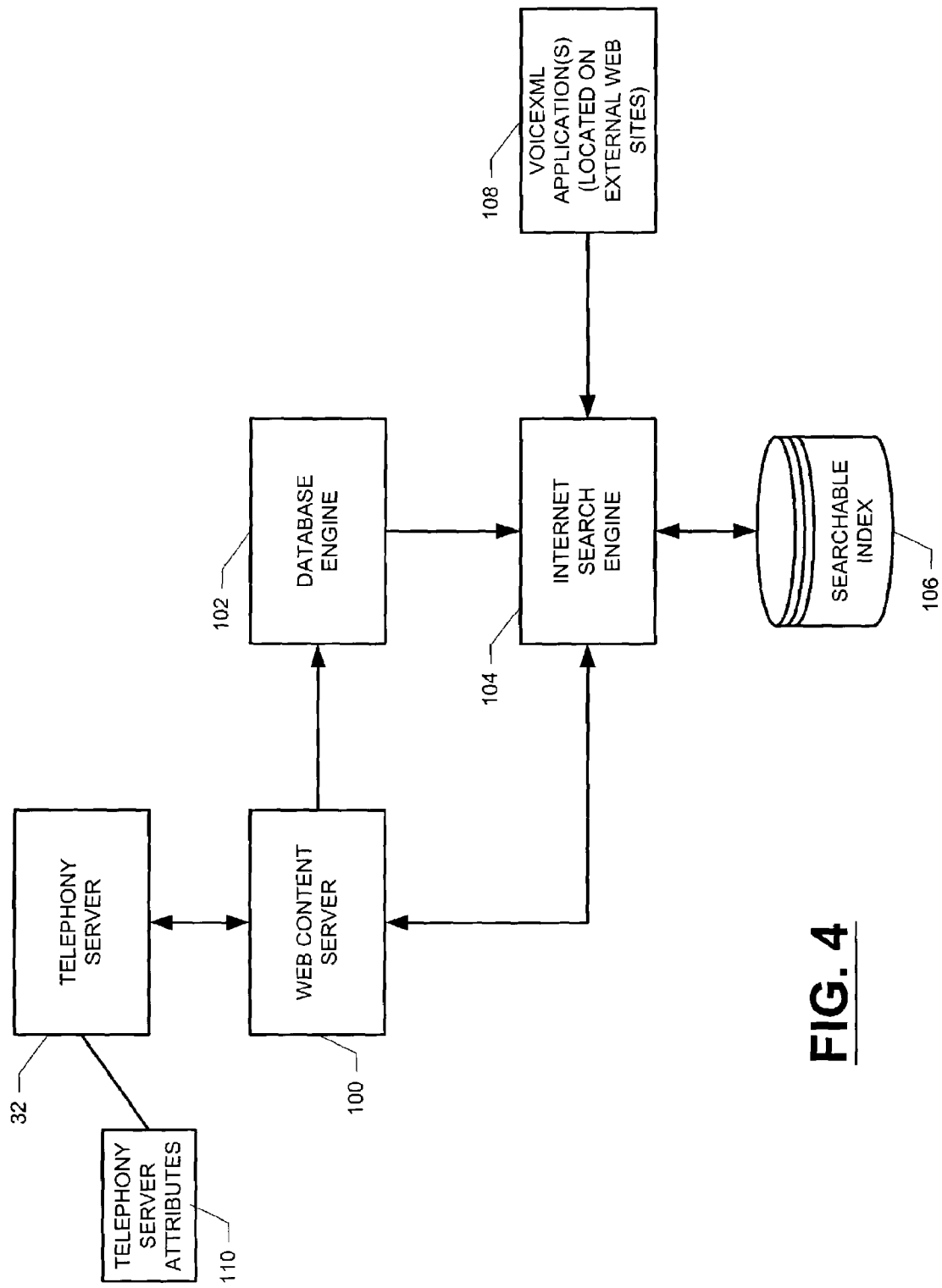
FIG. 4 is a block diagram that depicts a voice application retrieval web site used within the present invention.
Figure 5:
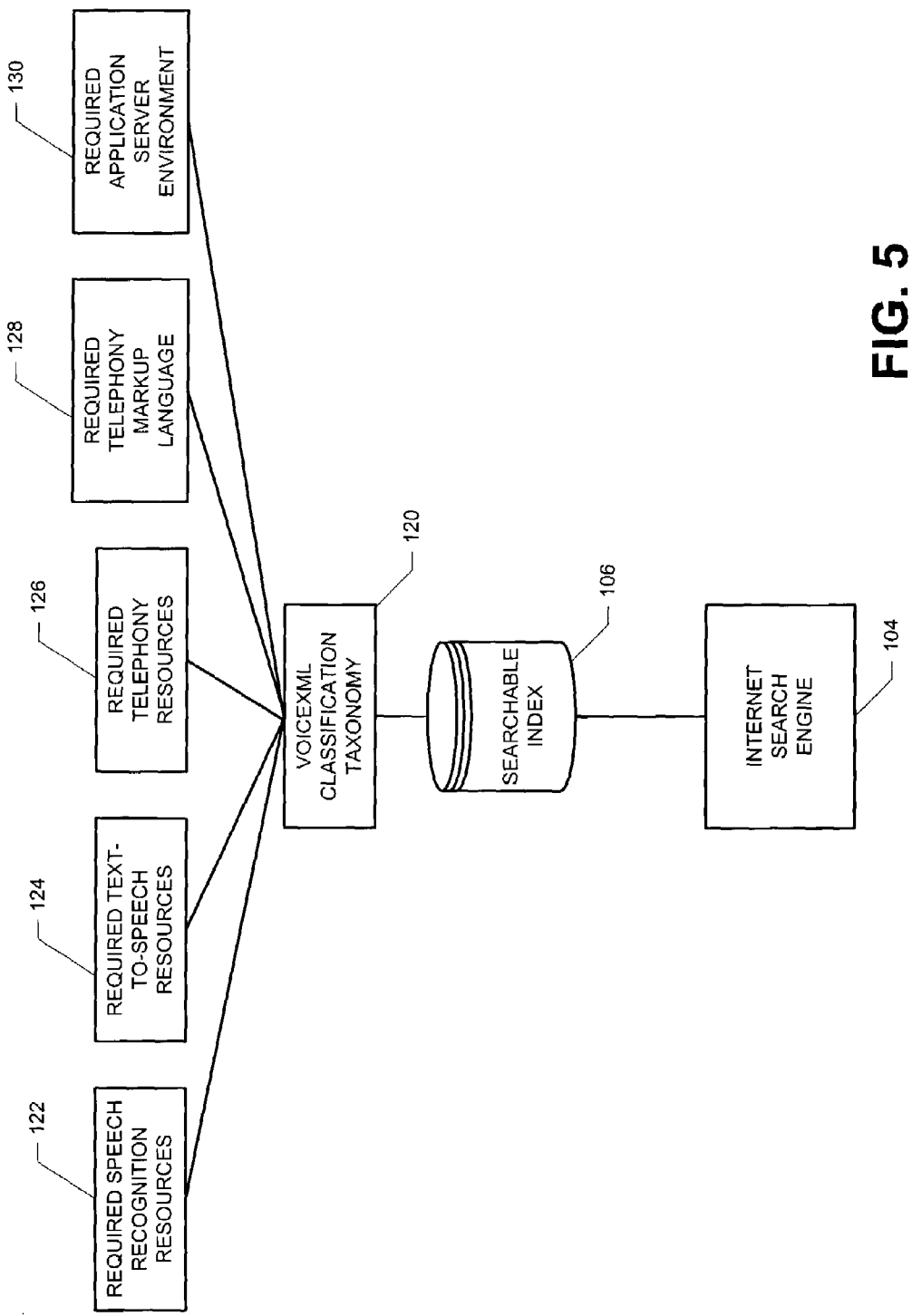
FIG. 5 is a data structure diagram that depicts the taxonomy data structure used by the voice application retrieval web site.
Figure 6:
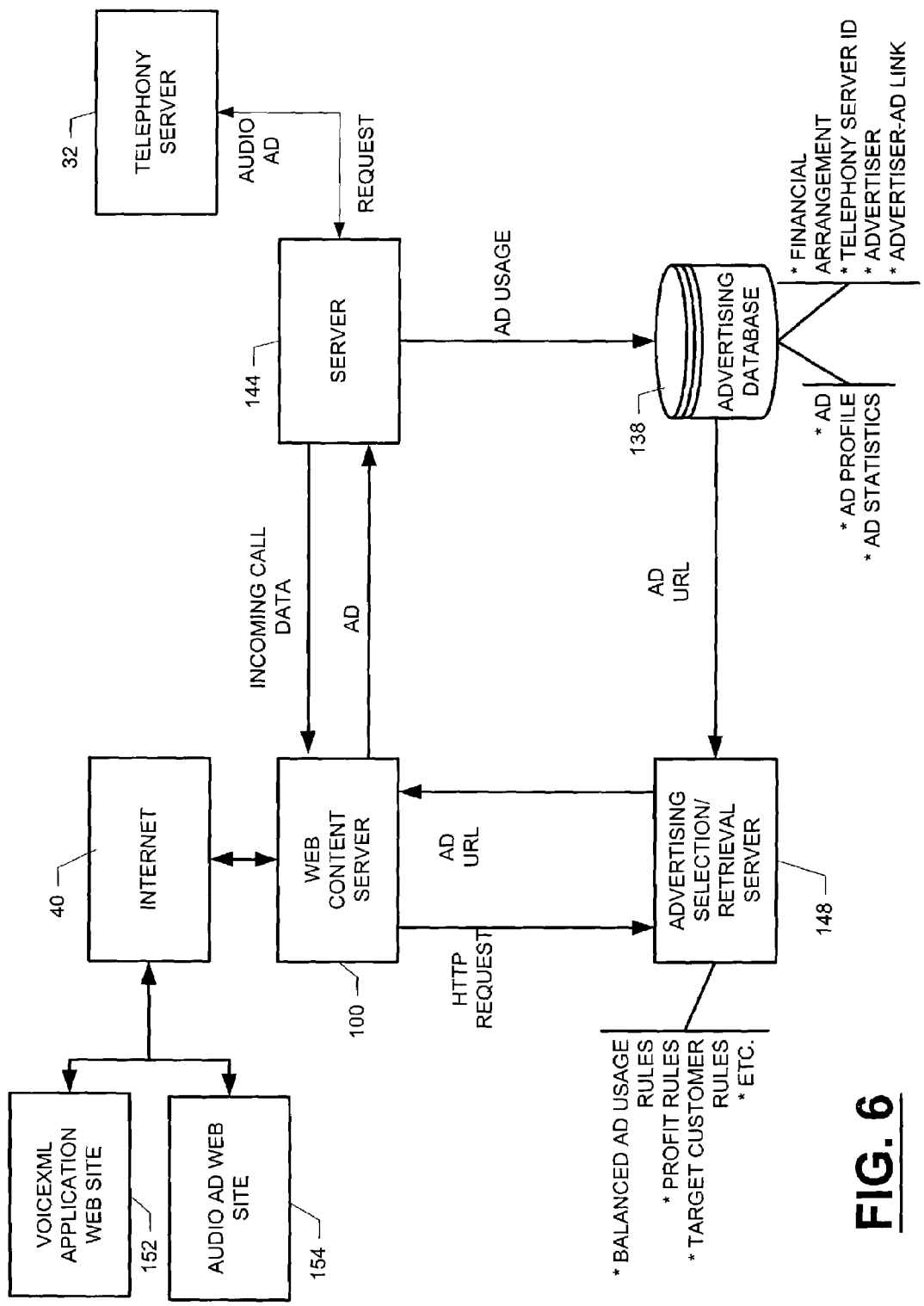
FIG. 6 is a block diagram that depicts an audio advertising system used within the present invention.

An embodiment of the present invention uses a remote web site to locate suitable VoiceXML applications 90. The remote web site may exact compensation for locating the suitable VoiceXML applications by having the user listen to an audio advertisement. FIGS. 4–6 describe below in greater detail the VoiceXML web site application retrieval system and the audio advertising system that are used within the present invention.

FIG. 4 is a system block diagram that depicts a voice application retrieval web site used within the present invention. Voice computer applications, such as VoiceXML applications, are indexed and catalogued. The voice applications are able to be searched using the index and linked into the telephony server. Once linked, the user has access via a wireless communication device to the services provided by the voice applications.

A user utilizes a communication device to access the user's telephony server 32. The present invention may be utilized by many different types of communication devices, such as a cellular communication device. The user may be accessing the telephony server 32 to have a service performed. A previously mentioned example of a service includes the telephony server 32 receiving a call from the user so that the user may locate a restaurant in a certain city. The telephony server 32 uses a web content server 100 to access a restaurant-locating voice application 108 that is on a network, such as the Internet. The voice application 108 may be a VoiceXML application located on a remote web site.

The telephony server 32 determines that a service is needed in order to process the request from the user. The telephony server 32 communicates to the web content server 100 the characteristics of the needed service. The web content server 100 locates a voice application 108 that can provide the needed service.

The web content server 100 communicates to a database engine 102 the characteristics of the needed service. The database engine 102 uses an Internet search engine 104 to search a voice application index database 106. The database 106 contains an index of voice applications that have been catalogued according to a taxonomy of the present invention. For example, the taxonomy includes indexing voice applications based upon what resources are required to operate each voice application.

The database engine 102 formulates search criteria to locate voice applications that can provide the needed service. The search criteria is formulated based upon the characteristics of the needed service. The characteristics include what type of application is needed, such as whether the telephony server needs a restaurant-locating voice application or some other voice application type. The search criteria also includes telephony server attributes 110. Telephony server attributes 110 describe the operating characteristics of the telephony server 32, such as what speech engines are able to operate on the telephony server 32.

The Internet search engine 104 uses the search criteria to determine which voice applications are suitable to fulfill the telephony server's request. When the location of at least one suitable voice application has been identified, the Internet search engine 104 retrieves the suitable voice application 108 over the Internet. The Internet search engine 104 then provides the voice application 108 to the telephony server 32 via the web content server 100. The telephony server 32 performs the functions of the voice application 108 in order to satisfy the request of the user 32.

FIG. 5 is a data structure diagram depicting the schema of the searchable index database 106. The index database 106 is structured according to a taxonomy 120 that classifies voice applications. The taxonomy 120 includes: a data structure 122 to store information about speech recognition resources required by the voice applications; a data structure 124 to store information about text-to-speech resources required by the voice applications; a data store 126 to store telephony resources required by the voice applications; a data structure 128 to store the version of the markup languages used by the voice applications; and a data structure 130 to store the application server environment information and licensing information of the voice applications.

The schema of the index database 106 may be implemented in a relational database. However, it should be understood that the present invention is not limited to a relational database environment, but includes computer information storage schemes that permit the storage and retrieval of the voice application classification data.

With reference to FIG. 6, the advertising selection and retrieval computer system of the present invention ensures delivery of the audio ad to the user. The present invention retrieves audio ads from the advertising database 138 in response to an incoming call from the telephony server 32. A user may be using a telephone or a wireless communication device to communicate with the telephony server 32 to have a service performed for the user. An example of a service includes the telephony server 32 receiving a call from the user so that the user may locate a restaurant in a certain city. The telephony server 32 uses the web content server 100 to access a restaurant-locating software application that is on a network, such as the Internet 40. The application may be a VoiceXML application located on a remote web site 152. Another exemplary application includes a user calling to locate the phone number of another individual. In this latter example, the application is a phone number lookup VoiceXML application.

The telephony server 32 forwards the incoming call to a server 144 (which may be the server of the ISP) which forwards the call to a web content server 100. The web content server 100 formulates a hypertext transfer protocol (http) request for an audio ad. The request is sent to the advertising selection/retrieval server 148 for processing. The advertising selection/retrieval server 148 selects an appropriate audio ad from the advertising database 138 and sends back an ad location identifier to the web content server 100. The web content server 100 retrieves the audio file from a web site 154 based upon the ad location identifier and dynamically inserts the ad audio file into the VoiceXML application. The web content server sends the VoiceXML application back to the telephony server 32 so that the VoiceXML application may be executed. The audio file is also sent so that it may be played for the user of the telephony server 32.

The web content server 100 may include in the http request such information as the type of user that is placing the incoming call. The web content server 100 knows what type of user is placing the incoming call based upon information that the user has already provided to the telephony server 32. For example, the telephony server 32 may know where the user is located based upon the area code of the incoming call or the telephony server 32 has a database that stores profiles of its users. The user's request may also furnish additional information. For example, if the user is requesting jewelry information, then the web content server 100 may supplement the http request with that profile information. In such a situation, the advertising selection/retrieval server 148 may heighten the probability that a jewelry-related audio ad be selected. The telephony server 32 may also have asked the user questions about the user's profile.

The advertising selection/retrieval server 148 selects an audio ad based upon certain predetermined rules. The ad selection rules include: balanced ad usage rules, profit rules (e.g., revenue sharing rules), target user/customer profile rules, and other selection rules that will be apparent to one skilled in the art. The balanced ad usage rules ensure that audio ads are played at least a certain amount of times. The profit rules optimize the amount of earnings the operators of the present invention acquire for the playing of the audio ads. For example, the profit rules may indicate that a first audio ad be played more often than a second audio ad when the first audio ad's financial arrangement is based upon a profit-sharing arrangement, and the second audio ad's financial arrangement is a set fee arrangement. The target user profile rules ensure that audio ads that fit a user profile are played. For example, a jewelry-related audio ad is played for a user who has requested jewelry-related information. Examples of other selection rules include accounting information (such as whether the advertiser is current in its payments to the operators), application service provider configuration, and content provider configuration.

The telephony server 32 provides ad usage data which is stored in the advertising database. The telephony server 32 records how long an audio ad was played to the user. The user may terminate the call before the entire audio ad was played. The ad usage information is sent to advertisers to provide feedback on the quality of their ads. For example, if a certain ad is habitually terminated early by users, then this serves as an indication that the ad may need to be improved or replaced.

The present invention operates with free content providers. In this context, the system of the present invention is entitled to a certain number of minutes (i.e., four minutes) of its own ad for every time slot (e.g., twenty-two minutes) while the application service provider provides a piece of time for its own ad. In other words, for every block of time, say thirty minutes, the content provider can use only twenty-two minutes of that time block while keeping the remaining four minutes for its own ad and four minutes for the application service provider.

The present invention includes a revenue sharing system. The hosting company who owns the advertising servers charges a one time listing fee and monthly platform usage fees from advertising agencies and telephony server operators. The advertising agencies pay the hosting company with the listing fee and monthly platform fee, and pay the server operators (i.e., the ISPs) the ad usage fee.

The server operators pay the hosting company the listing and monthly platform fees and receive the ad usage fees from matched advertisers. The server operators distribute the ad fees with the connected application providers, and charge the application providers the application usage/listing fees.

Figure 7:
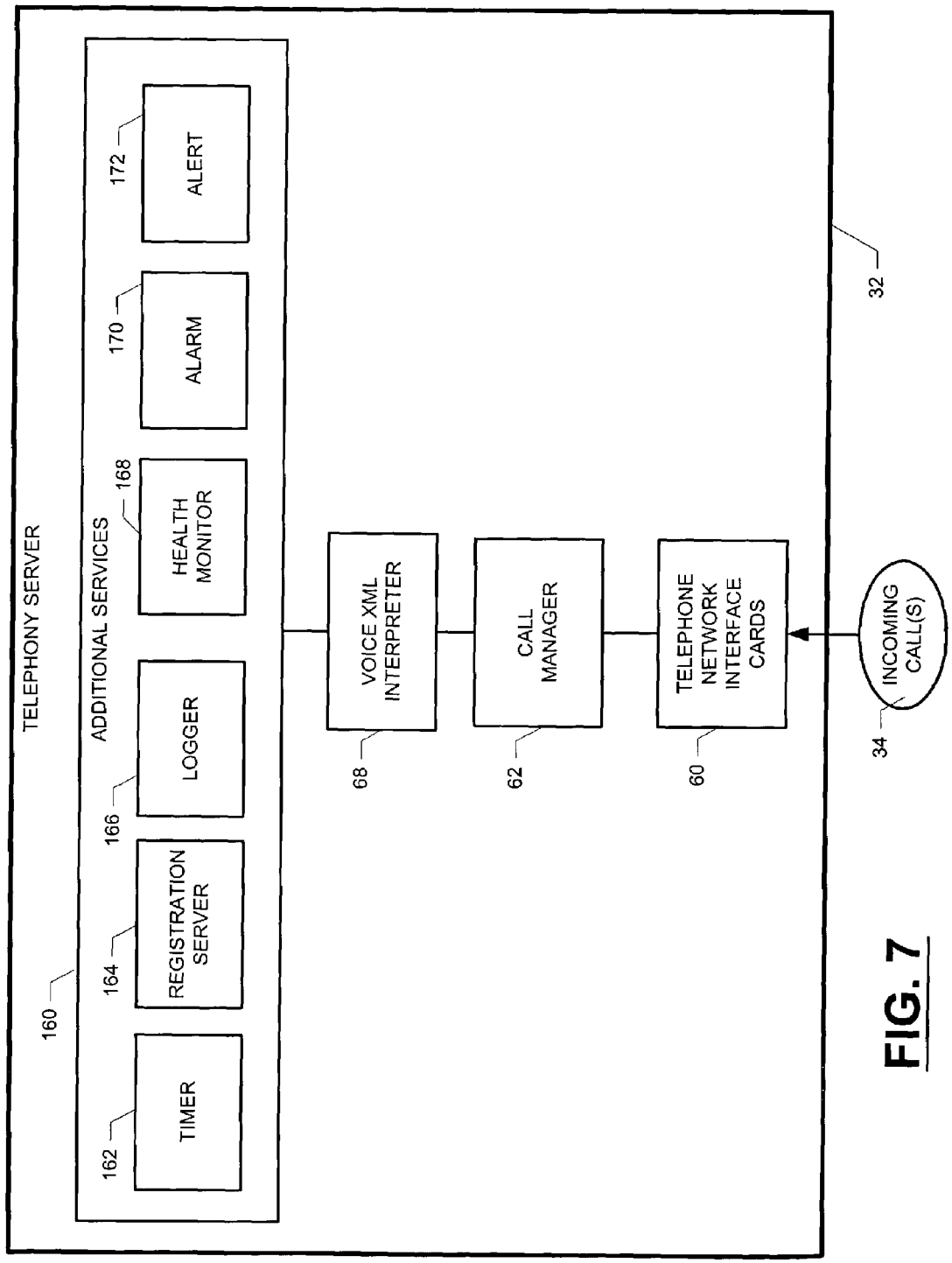
FIG. 7 is a block diagram that depicts additional operations of the call manager of the present invention.

FIG. 7 is a block diagram that depicts additional services 160 of the present invention. A timer 162 provides timer services to VoiceXML applications. For example, a VoiceXML application may use the timer 162 to determine when the user does not provide a response within a predetermined amount of time.

Registration server 164 registers the telephony processes that are responsible for executing VoiceXML applications. Logger 166 is a centralized logging mechanism that records debug, warning, and error messages as well as detailed call information from VoiceXML applications. Health monitor 168 monitors the VoiceXML applications by sending out periodic messages. The Health monitor 168 also includes a telnet interface which allows users or scripts to perform monitoring, maintenance, or administrative tasks.

The alarm 170 acts as an interface to the sentry alarm board for various physical conditions of the system, such as voltage and temperature. The alert module 172 takes appropriate actions for system problems, including phone calls, paging, and sending electronic mail messages so that the abnormal conditions can analyzed and remedied if needed.

Figure 8:
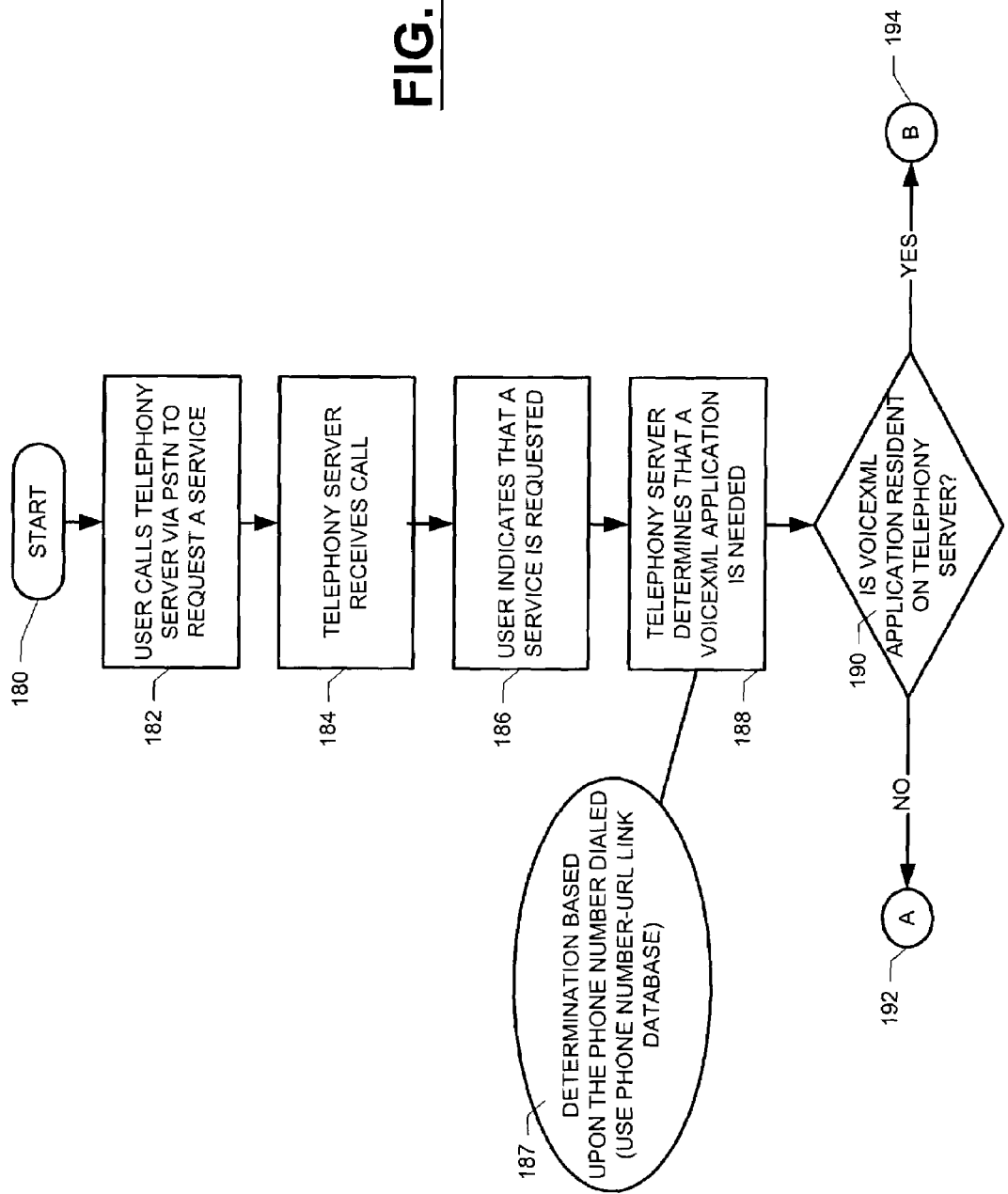
FIGS. 8–12 are flowcharts that depict the operational steps of the present invention for processing calls from users.

FIGS. 8–12 are flowcharts that depict the operational steps of the present invention in processing a call from a user. With reference to FIG. 8, start indication block 180 indicates that process block 182 is performed wherein a user calls the user's telephony server over a PSTN connection in order to request a service (such as a restaurant location service). At process block 184, the telephony server receives the call.

At process block 186, the user indicates the service that is desired. At process block 188, the telephony server determines that a VoiceXML application is needed in order to provide the service. An embodiment of the present invention includes determining what VoiceXML application to use based upon the phone number dialed by the user as shown at reference numeral 187. For example, a user may have requested an individual's telephone number and dialed "1-555-1212" to obtain the information. The telephony server associates this number with a predetermined URL which contains a phone number lookup voice application. A phone number-URL link database may be used to retrieve a web page URL based upon a dialed phone number, and the web page at the URL will perform the service.

Decision block 190 examines whether the VoiceXML application is resident on the telephony server. If it is resident, then processing continues on FIG. 11 at process block 220. It should be understood that the present invention does not typically retain VoiceXML applications on the telephony server and retrieves VoiceXML applications in real-time in order to satisfy a present need. When the VoiceXML application is not resident on the telephony server, then processing continues on FIG. 9 at process block 200.

Figure 9:
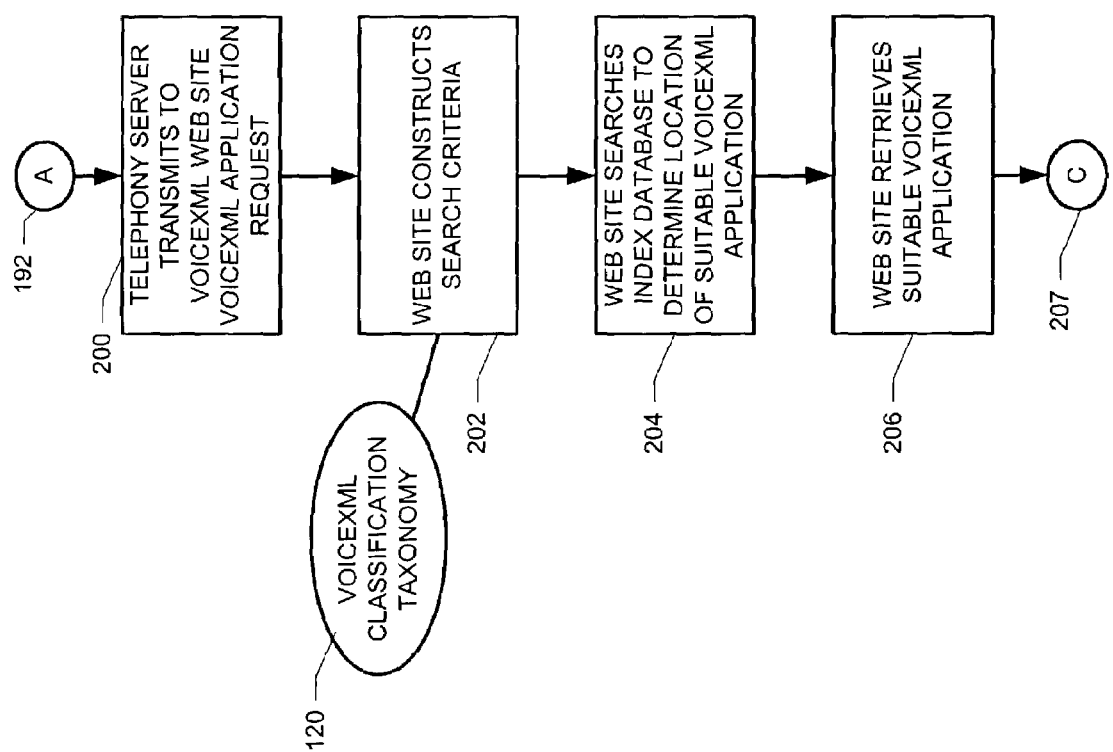

With reference to FIG. 9, the telephony server transmits to the VoiceXML application retrieval web site a VoiceXML application request at process block 200. The request contains search criteria so that the web site may search its database according to its VoiceXML classification taxonomy 120. Process block 202 constructs the search criteria in accordance with the VoiceXML classification taxonomy 120. The search criteria may for example contain the attributes of the telephony server (such as what speech engines operate upon the telephony server), the type of service requested, and other such criteria to retrieve a suitable voice application.

The search is performed at process block 204 in order to determine the location of a suitable VoiceXML application. Process block 206 retrieves a suitable VoiceXML application. Continuation block 207 indicates that processing continues on FIG. 10.

Figure 10:
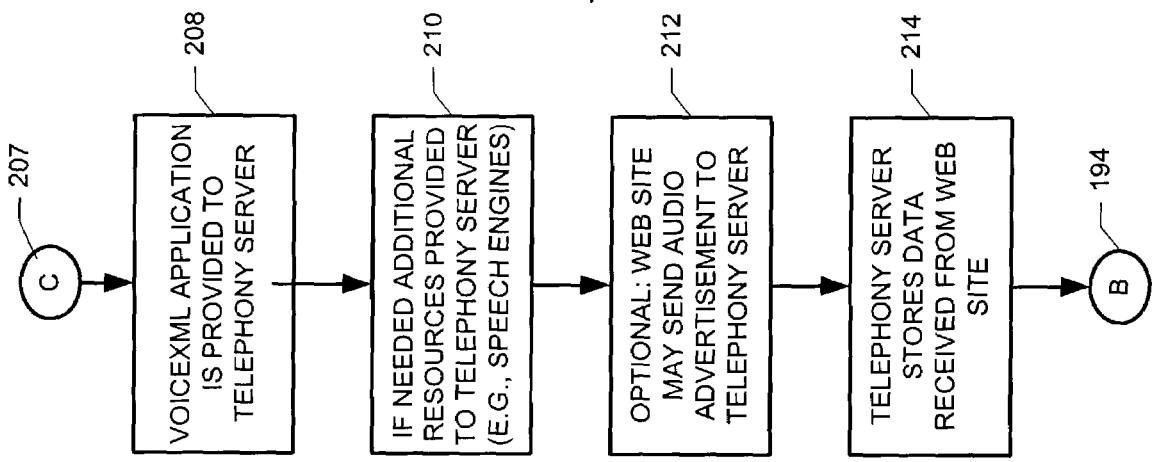

With reference to FIG. 10, the VoiceXML application is provided to the telephony server at process block 208. Additional resources (if needed) are provided at process block 210 to the telephony server (e.g., speech engines) in order to operate the VoiceXML application. At process block 212, the web site may send an audio advertisement to the telephony server. The audio advertisement sent to the telephony server may have been selected based upon the profile of the user using the telephony server. The telephony server stores the data (e.g., the VoiceXML application and audio advertisement) on its storage medium (e.g., its random access memory, hard drive, etc.). Processing continues on FIG. 11 at process block 220.

Figure 11:
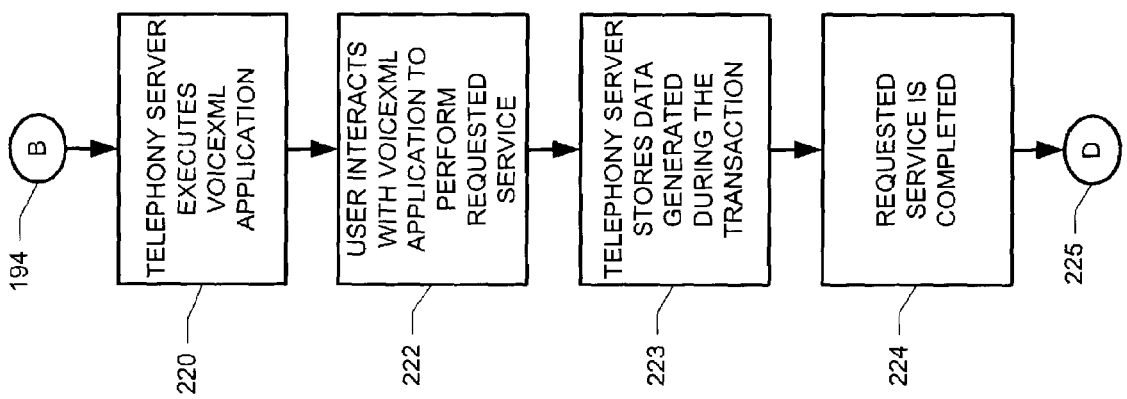

With reference to FIG. 11, the telephony server executes the VoiceXML application at process block 220. At process block 222, the user interacts with the VoiceXML application so that the requested service may be performed. At process block 223, the telephony server temporarily stores the data generated during the transaction. The requested service is completed at process block 224. Processing continues on FIG. 12 at process block 226.

Figure 12:
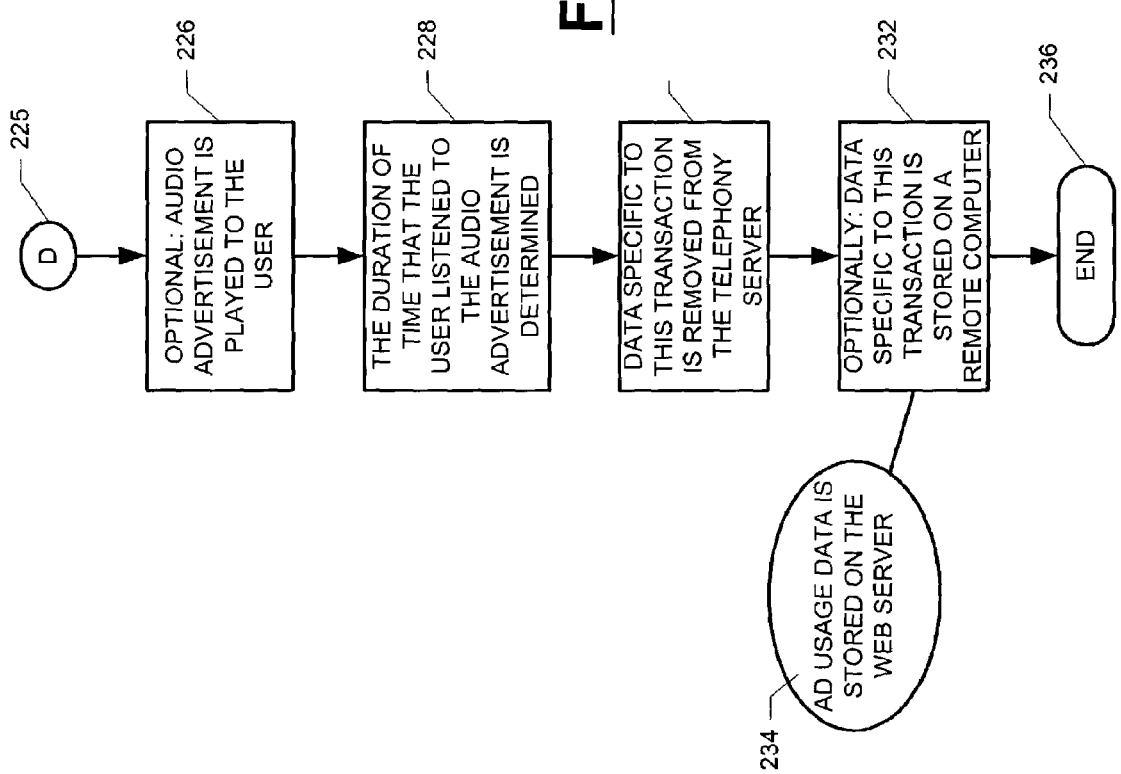

With reference to FIG. 12, if an audio advertisement had been sent, then the audio advertisement is played to the user at process block 226. Process block 228 determines the duration of time that the user listened to the audio advertisement. Process block 230 removes data that is specific to the transaction from the telephony server. This enables the telephony server to be essentially stateless after handling a transaction. Process block 232 sends the specific transactional data from the telephony server to a remote computer, such as the remote web content server. This may include sending the ad usage data 234 from the telephony server to the remote web site which stores the ad usage data in its database. Processing terminates at end block 236.

Figure 13:
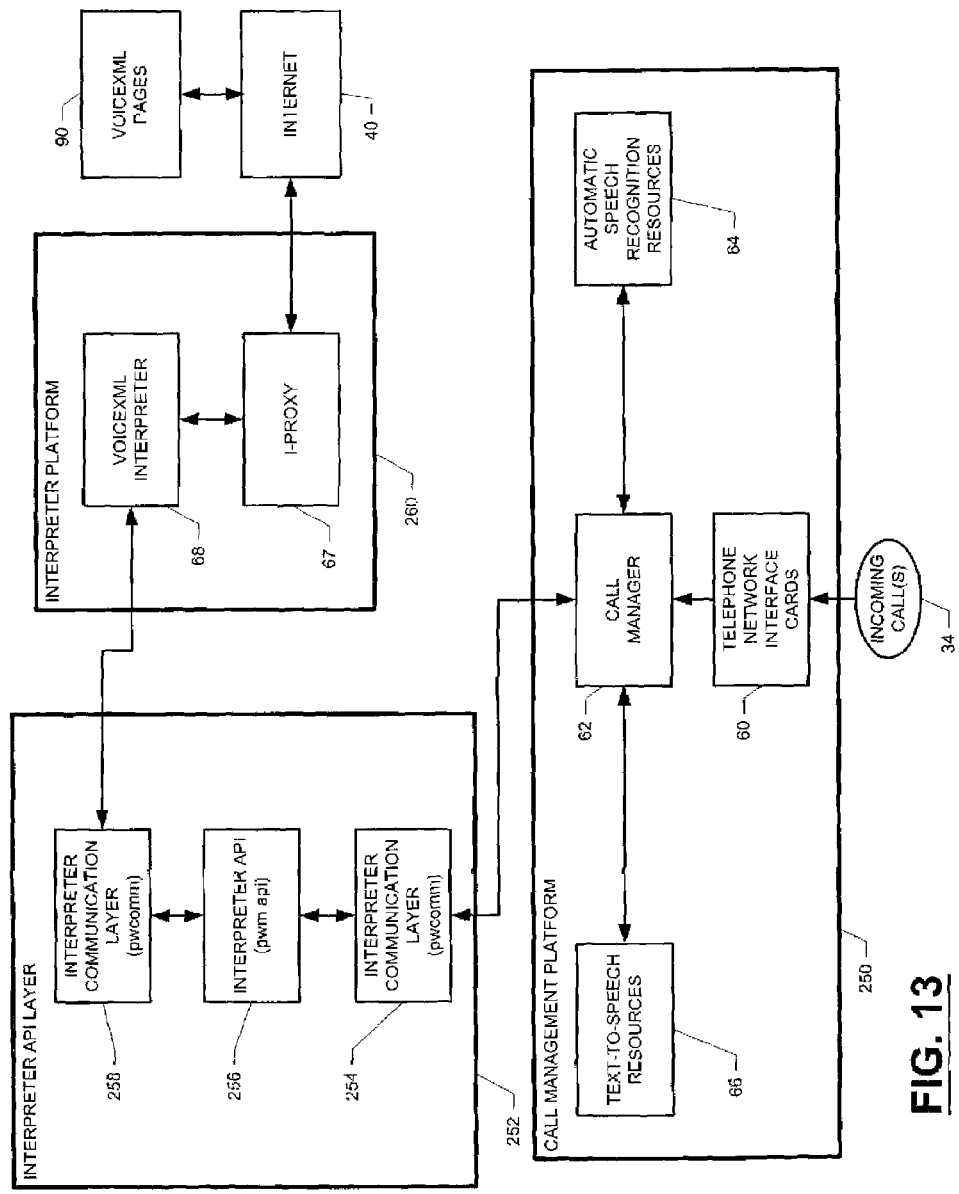
FIG. 13 is a block diagram depicting the VoiceXML communication API (application programming interface)

FIG. 13 depicts a mechanism in which data communication occurs between the call management platform 250 and the VoiceXML interpreter platform 260 through an interpreter API (application programming interface) layer 252. The interpreter API layer 252 allows the call management platform 250 to utilize services provided by the interpreter platform 260 without having to know the communication and hardware specific requirements of the interpreter platform 260.

The call management platform 250 first receives a call requesting a service via the telephony hardware 60. It should be understood that the other ways may be used to send calls to the call manager 62, such as through VoIP mechanisms. The interpreter platform 260 needs to be invoked by the call management platform 250 in order to process the call's request. When such communication is necessary, the call manager 62 sends the message to the interpreter API layer 252, such as through an interprocess communication (IPC) facility as found within the field of the present invention.

The call manager 32 first registers itself with the VoiceXML interpreter 68 using a PW_Open( ) function contained in the interpreter communication layer 254. During the registration, the call manager 62 establishes what services it requires during the communication session based upon the incoming message and what services it provides for the incoming messages. Services requested by the call manager 62 are contained as an argument when invoking the PW_Open( ) function. Services provided by the call manager 62 are also contained as an argument in the PW_Open( ) function. The PW_Open( ) function further includes the application server name.

The call manager 62 uses the interpreter communication layer 254 to apply a wrapper to the call's data to create an encapsulated message understandable to the interpreter API 256. The wrapper identifies the type of message being sent. For example, the message may be a new call initiation, a continuation of an existing call, or an attempt to reestablish an earlier call that may have been lost. After wrapping into a format understandable by the interpreter API 256, the call manager 62 sends the message to the interpreter API 256. The interpreter API 256 then unwraps the message and forwards the message to communication layer 258. The communication layer 258 knows how to communicate messages between the interpreter API 256 and the interpreter platform 260 by wrapping the message into a format understandable by the interpreter platform 260.

Upon receipt of the wrapped message from the interpreter communication layer 258, the VoiceXML interpreter 68 provides the requested data processing service in order to generate reply data. The VoiceXML interpreter 68 takes the reply data and uses the interpreter communication layer 258 to wrap and encapsulate the reply data to form a reply message for ultimate transmission to the call management platform 250. The wrapped reply message is transmitted first to the interpreter API 256 which unwraps the message and then forwards the message to the interpreter communication layer 254. The interpreter layer 254 wraps the message in a format understandable to the call management platform 250 for use by the call management platform 250.

Figure 14:
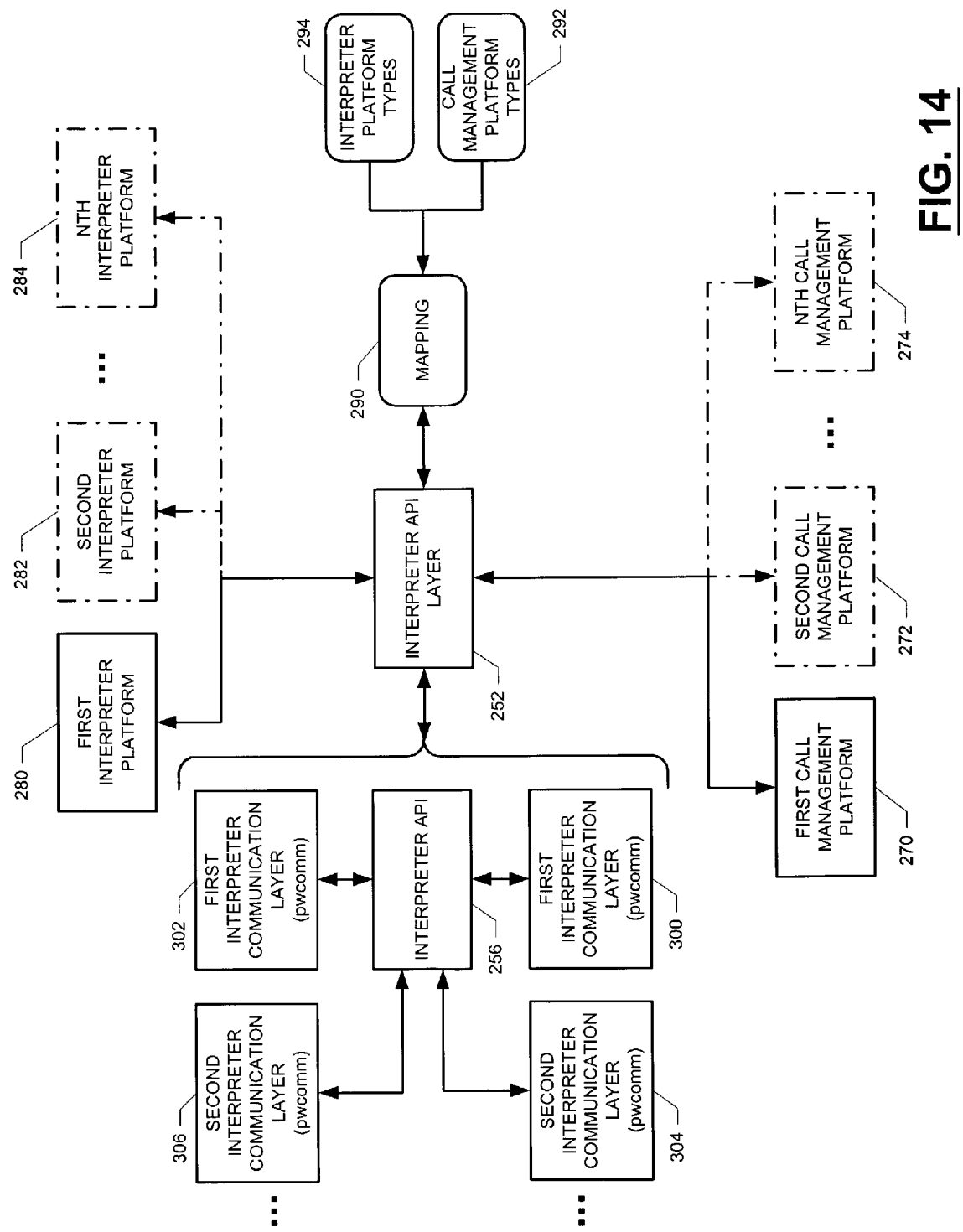
FIG. 14 is a block diagram depicting the use of different call management and interpreter platforms with the VoiceXML communication API.

FIG. 14 depicts the interpreter API layer 252 as the middle communication component that provides the capability of allowing multiple call management platforms (270, 272, 274) to communicate with multiple VoiceXML interpreter platforms (280, 282, 284). The interpreter API layer 252 accesses a mapping data set 290 to determine which call management and interpreter platforms are used within the system.

System operators configure the mapping data set 290 to specify which call management platforms and interpreter platforms are used within the system. For example, system operators may initially configure the mapping data set 290 to specify that a first type of call management platform is to communicate with a first type of interpreter platform. The system operators select the appropriate call management platform from a list of call management platform types 292. Likewise, the system operators select the appropriate VoiceXML interpreter platform from a list of interpreter platform types. In this way, the interpreter API layer 252 contains a first interpreter communication layer 300 that can handle communications with the first type of call management platform 270 as well as a first interpreter communication layer 302 that can handle communications with the first type of interpreter platform 280.

Additional platforms may be added as the need arises. For example, a second call management platform 272 may be added to the mapping data set 290 in order to communicate with the first type of interpreter platform 280. A second interpreter communication layer 304 is used in order to allow such communications to occur.

Alternatively, the second call management platform 272 may be added to communicate with a second type of interpreter platform 282 (which could be a non-VoiceXML interpreter platform or a VoiceXML interpreter platform whose hardware and communication requirements are significantly different from the first interpreter's platform). In this respect, a second interpreter communication layer 304 provides communication between the call management server and the interpreter API, and another interpreter communication layer 306 handles communications between the interpreter API and the second interpreter platform. The first call management platform 270 may also be configured to communicate with the second type of interpreter platform 282 if the first type of interpreter platform 280 is overloaded due to processing other requests.

Figure 15:
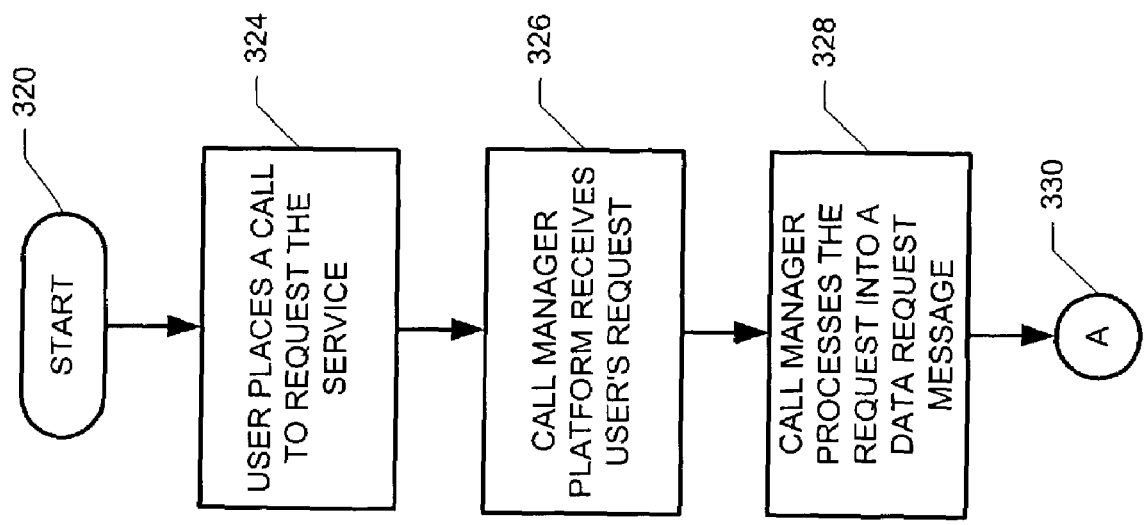
FIGS. 15–19 are flow charts depicting an operational scenario to process a call using the VoiceXML communication API.

FIGS. 15–19 illustrate an operational scenario wherein a user wishes to obtain hotel reservation information. With reference to FIG. 15, start block 320 indicates that at process block 324, the user places a call to request a hotel reservation service, such as to reserve a hotel room in a particular city for a predetermined duration. The call manager receives the user's request at process block 326. Process block 328 converts the service request into a data request message. Processing continues on FIG. 16 as indicated by continuation block 330.

Figure 16:
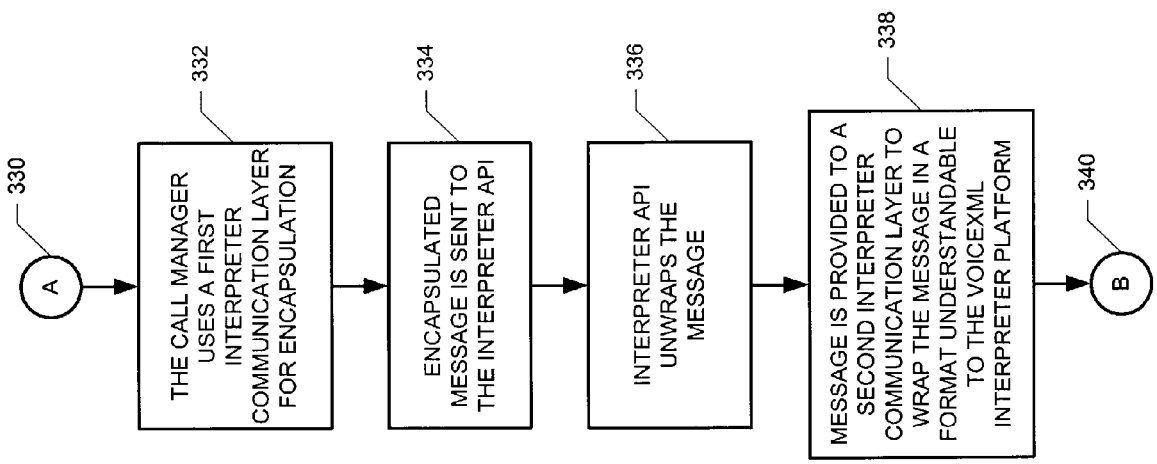

With reference to FIG. 16, the call manager uses an interpreter communication layer to encapsulate the message at process block 332. The encapsulated message is sent to the interpreter API at process block 334 so that it can unwrap the message at process block 336. The interpreter API provides the message to another interpreter communication layer so that the message may be formatted to be understandable to the VoiceXML interpreter platform. Processing continues on FIG. 17 as indicated by continuation block 340.

Figure 17:
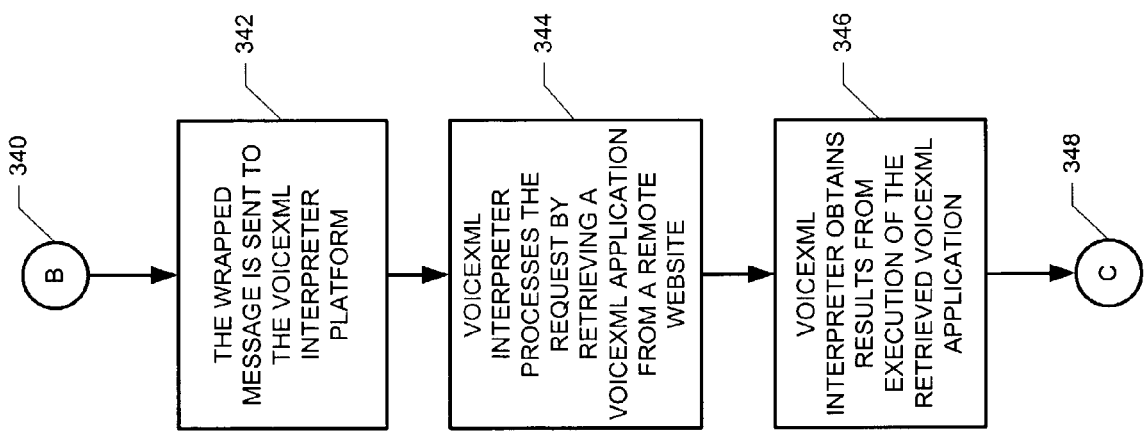

With reference to FIG. 17, the wrapped message is sent to the VoiceXML interpreter at process block 342. At process block 344, the VoiceXML interpreter processes the user's request by retrieving a VoiceXML application from a remote website (or it may query a remote Internet website for hotel reservation information that satisfies the user's request). The VoiceXML interpreter obtains results through use of the VoiceXML application at process block 346. Processing continues on FIG. 18 as indicated by continuation block 348.

Figure 18:
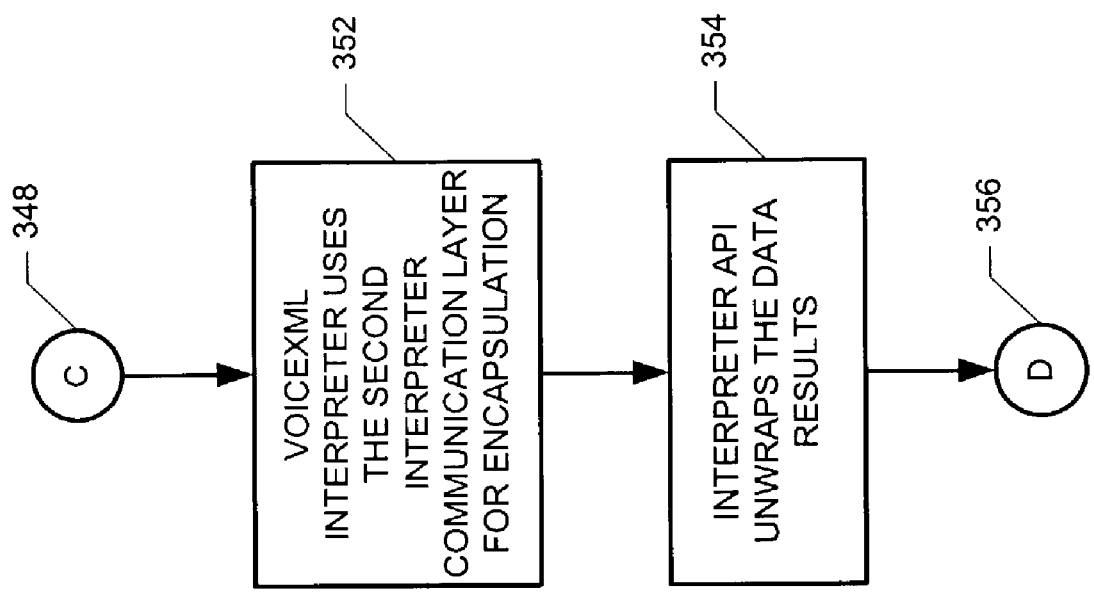

With reference to FIG. 18, the VoiceXML interpreter uses the interpreter communication layer at process block 352 to encapsulate the data results for delivery to the interpreter API. At process block 354, the interpreter API unwraps the data results. Processing continues on FIG. 19 as indicated by continuation block 356.

Figure 19:
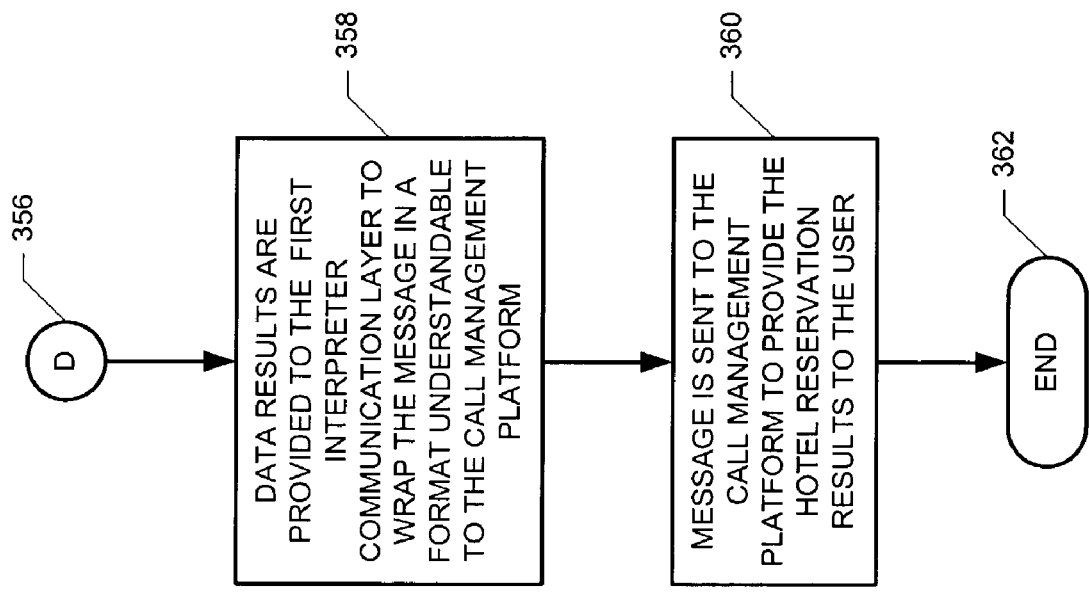

With reference to FIG. 19, data results are provided at process block 358 to the interpreter communication layer so that it can wrap the message in a format understandable to the call management platform. The wrapped message is sent to the call management platform to provide the hotel reservation results to the user. Processing for this exemplary operational scenario terminates at end block 362.

The operational scenario illustrates that the present invention allows telephony systems to efficiently and effectively provide services to telephone users. However, it should be understood that the embodiments described with reference to the operational scenario and to the drawing figures are presented only to demonstrate examples of the invention and that the present invention includes possibly having many messages being communicated between the call management platform and the VoiceXML interpreter platform to process a user's request. Additional and/or alternative embodiments of the invention would be apparent to one of ordinary skill in the art upon reading this disclosure.

It is claimed:

1. A computer-implemented method for processing a service request received from a telephone communication device, comprising the steps of:

determining a call management platform type from a list of call management platform types, said determined call management platform type corresponding to a call management platform that is to receive the service request from the telephone communication device;

determining a voice interpreter platform type from a list of voice interpreter platform types, said voice interpreter platform type corresponding to a voice interpreter platform that processes the service request from the telephone communication device;

receiving the service request at the call management platform;

using a first interpreter communication layer that corresponds to the determined call management platform type to wrap the received service request in a format to be processed by an interpreter application programming interface (API);

unwrapping the message by the interpreter API and providing the unwrapped message to a second interpreter communication layer; and using the second interpreter communication layer that corresponds to the determined voice interpreter platform type to wrap the unwrapped message in a format to be processed by the voice interpreter platform, said voice interpreter platform retrieving over a computer network a voice application from a remote web site based upon the message wrapped by the second interpreter communication layer, and using the retrieved voice application to process the user's request.

2. The method of claim 1 wherein the second interpreter communication layer wraps data results from processing the user's request in order to send the wrapped data results to the interpreter API, said method further comprising the steps of:

unwrapping the data results by the interpreter API and providing the unwrapped data results to the first interpreter communication layer; and using the first interpreter communication layer to wrap the data results in a format for use by the call management platform.

3. The method of claim 1 wherein another communication layer is used to allow the call management platform to communicate with a second voice interpreter platform, wherein the second voice interpreter platform is a different type from the other voice interpreter platform.

4. The method of claim 3 wherein an additional communication layer is used to allow the second voice interpreter platform to communicate with a second call management platform, wherein the second call management platform is a different type from the other call management platform,
said second call management platform being configured to communicate with the second voice interpreter platform to process the service request if the other voice interpreter platform is determined to be overloaded.

5. The method of claim 1 wherein the user uses a wireless communication device.

6. The method of claim 1 wherein the voice application is a voice markup language application.

7. The method of claim 6 wherein the voice application is a Voice Extensible Markup Language application.

8. The method of claim 1 further comprising the step of:
transmitting a voice application request to the remote web site over a computer network, wherein the web site selects a voice markup language program based upon the request and provides the selected voice markup language program to the voice interpreter platform.

9. The method of claim 8 wherein the provided voice markup language program interacts by a speech-based conversation with the user.

10. The method of claim 9 wherein the web site includes a database that stores data about voice applications in accordance with a predetermined voice application taxonomy, wherein the web site retrieves voice application data based upon the request from the voice interpreter platform, wherein the retrieved voice application data is used to provide the voice markup language program to the voice interpreter platform.

11. The method of claim 10 wherein the request is based at least in part upon the voice application taxonomy.

12. The method of claim 11 wherein the voice application taxonomy includes classifications selected from the group consisting of required speech engine resources, required telephony resources, required telephony markup language, required application server environment, and combinations thereof.

13. The method of claim 12 wherein a plurality of audio advertisements is accessible by the web site, wherein at least one of the audio advertisements is retrieved based upon predetermined selection rules, wherein the retrieved audio advertisement is provided to the voice interpreter platform and played to the user.

14. The method of claim 13 wherein the request includes a user profile, wherein at least one of the audio advertisements that substantially matches the user profile is played to the user.

15. The method of claim 14 wherein the selection rules includes balanced ad usage rules that are used to determine which stored audio advertisement to retrieve.

16. The method of claim 1 wherein a telephony system that includes the call management platform and the voice interpreter platform routes calls from the user over a Voice Over IP (VoIP) connection.

17. The method of claim 1 wherein a telephony system that includes the call management platform and the voice interpreter platform routes calls from the user over a Voice on the Net (VON) connection.

18. The method of claim 17 wherein the telephony system routes the call from the user over a public switched telephone network.

19. The method of claim 1 wherein the computer network is a global communication network.

20. The method of claim 19 wherein the computer network is an Internet network.

21. The method of claim 1 further comprising the step of:
after performing the requested service, transferring at least a portion of the user service data to a remote computer on the computer network and removing the voice application and the user service data from the voice interpreter platform.

22. The method of claim 1 further comprising the step of:
selecting at least one speech engine to operate with the retrieved voice application.

23. The method of claim 1 further comprising the step of:
selecting at least one speech recognition engine to operate with the retrieved voice application.

24. The method of claim 23 further comprising the step of:
selecting at least one text-to-speech engine to operate with the retrieved voice application.

25. The method of claim 1 further comprising the step of:
detecting an abnormal condition during execution of the voice application and providing notification of the detected abnormal condition.

26. The method of claim 1 wherein the voice interpreter platform provides additional functions for operation of the voice application, wherein the additional functions are selected from the group consisting of timer means, registration means, logger means, health monitor means, alarm means, alert means, and combinations thereof.

27. The method of claim 1 further comprising the step of:
determining which voice application to retrieve over the computer network based upon dialed number of the incoming call.

28. The method of claim 27 wherein a database stores an association between phone numbers and computer network identifiers, said method further comprising the steps of:
determining the dialed number of the incoming call;
retrieving from the database a computer network identifier that is associated with the determined dialed number; and
retrieving over the computer network the voice application that is identified by the computer network identifier.

29. The method of claim 1 further comprising the steps of:
using the retrieved voice application to have a speech-based conversation with the user to obtain service data from the user;
using the retrieved voice application to perform the requested service based upon the user-provided service data; and
after performing the requested service, the voice application and the user service data are removed from the voice interpreter platform.

30. The method of claim 29 wherein the voice application is a Voice Extensible Markup Language application.

* * * * *